United States Patent [19]

Steiner

[11] 4,164,555

[45] Aug. 14, 1979

[54] POLLUTION CONTROL SYSTEM AND METHOD FOR THE REMOVAL OF SULFUR OXIDES

[75] Inventor: Peter Steiner, Edison, N.J.

[73] Assignee: Foster Wheeler Energy Corporation, Livingston, N.J.

[21] Appl. No.: 832,506

[22] Filed: Sep. 12, 1977

[51] Int. Cl.$^2$ .............................................. C01B 17/04
[52] U.S. Cl. .................................... 423/569; 423/244
[58] Field of Search ............... 423/569, 570, 574, 244; 23/262, 263, 277

[56] References Cited

U.S. PATENT DOCUMENTS

| | | | |
|---|---|---|---|
| 1,908,873 | 5/1933 | Tyrer | 423/569 |
| 3,810,972 | 5/1974 | Humphrey et al. | 423/569 |
| 4,041,141 | 8/1977 | Moss | 423/569 |

FOREIGN PATENT DOCUMENTS 2155320  10/1973  Fed. Rep. of Germany ........... 423/569

OTHER PUBLICATIONS

Steiner et al., *Advances in Chemistry Series;* No. 139; 1975, A.C.S. pp. 180–191.

*Primary Examiner*—G. O. Peters
*Attorney, Agent, or Firm*—Marvin A. Naigur; John E. Wilson; Warren B. Kice

[57] ABSTRACT

A pollution control system and method in which sulfur oxides in flue gases are adsorbed by activated char in a gas-solid contacting device. The saturated char is regenerated in an integrated desorption-reduction vessel, to which crushed coal and combustion-supporting air are supplied. A portion of the crushed coal is burned to provide the heat for the regeneration of the char, resulting in the formation of sulfur dioxide and carbon dioxide gases, and the chemical consumption of a portion of the char. The remaining crushed coal reduces the sulfur dioxide to gaseous sulfur, and results in a material having a porous system suitable for use in the adsorption of sulfur oxides. The remaining regenerated char and the oxidized coal are cycled back to the gas-solid contacting device, and the gaseous sulfur is condensed to liquid in a condenser.

13 Claims, 2 Drawing Figures

POLLUTION CONTROL SYSTEM AND METHOD FOR THE REMOVAL OF SULFUR OXIDES

BACKGROUND OF THE INVENTION

This invention relates generally to pollution control systems and, more particularly, to a pollution control system for the removal of sulfur oxides from flue gases and the reduction of the sulfur oxides to sulfur.

It is known in the field of atmospheric pollution control to use an adsorptive process for the desulfurization of flue gases in which the sulfur-containing material is adsorbed in the porous system of an activated carbonaceous material. In one such process, adsorption is carried out in a gas-solid contacting device in which the flue gases are contacted with activated char, and sulfur dioxide in a diluted form in the gas stream passing through the activated char is adsorbed and oxidized to sulfuric acid by the oxygen and water vapor present in the gas stream. Other acid gases, such as nitrogen oxides, are similarly adsorbed, and particulate matter entrained in the gas stream is filtered by passage of the stream through the activated char.

The acid-laden or saturated char is then usually thermally regenerated in a desorption vessel, or the like, by a process in which the sulfur-containing material is chemically changed in form, resulting in the decomposition of sulfuric acid to sulfur dioxide and water, whereby a portion of the carbonaceous adsorbent is oxidized to carbon dioxide. The by-product of the regeneration process is a gas stream containing 20-30% by volume of sulfur dioxide, which is directed to an off-gas treatment facility for further processing.

In an off-gas treatment system developed by the Foster Wheeler Corporation, the assignee of the present application, and disclosed in U.S. Patent Application Ser. No. 635,497, filed Nov. 26, 1975, the gas stream from the desorption vessel is directed to a reactor in which most of the sulfur dioxide is reduced to gaseous elemental sulfur, which is then condensed and stored in liquid or solid form. In either form, the elemental sulfur offers a non-polluting and easily-handled, salable product.

In the foregoing technique, a portion of the activated char is chemically consumed in the regeneration process and another portion becomes physically worn to a size which is ineffective in the reduction process. Consequently, the technique requires an additional supply of activated char to replace the quantity consumed. Since the activated char is the most expensive commodity consumed in the process, it would be economically desirable to either reduce the consumption of this commodity or to provide a less-expensive substitute to replenish the quantity consumed.

SUMMARY OF THE INVENTION

Accordingly, it is an object of the present invention to provide an efficient and effective system for the removal of sulfur oxides from flue gases.

Another object of the present invention is to provide a system of this type which requires a reduced investment of equipment and expensive raw material.

Yet another object of the present invention is to provide a system of this type which permits the utilization of a low-quality, input raw material to adsorb and reduce the sulfur oxides in the flue gases.

Still another object of the present invention is to provide a system of this type which would utilize the relatively-inexpensive by-product of the sulfur oxide reduction process as an adsorbent material for the removal of sulfur oxides from flue gases.

A further object of the present invention is to provide a system of this type and a method for effecting the removal in which the sulfur oxides are removed from the gases in an adsorber, and the saturated adsorbent material is regenerated and the sulfur oxides are reduced to elemental sulfur in an integrated functions reactor.

Toward the fulfillment of these and other objects, a pollution control system is provided for the removal of sulfur oxides in flue gases in which the gases are contacted with activated char in an adsorption vessel such that the sulfur oxides are adsorbed and oxidized in the porous system of the char as sulfuric acid. An integrated regeneration and reduction vessel is provided to continuously receive in parallel flow the acid-laden char, combustion-supporting air, and a quantity of crushed coal. Part of the crushed coal is burned to provide the reaction heat necessary to regenerate the saturated char. producing a continuous stream of sulfur dioxide as a by-product. The sulfur dioxide reacts chemically with a portion of the char and with the remaining crushed coal to produce gaseous elemental sulfur, which can be removed and liquified in a condenser for storage as liquid sulfur or cooled into solid form. Oxidation of the crushed coal by the sulfur dioxide produces a porous by-product which, along with the regenerated char, is cycled to the adsorption vessel for use in the adsorption process.

BRIEF DESCRIPTION OF THE DRAWINGS

The above description, as well as further objects, features and advantages of the present invention, will be more fully appreciated by reference to the following description of a presently-preferred but nonetheless illustrative embodiment in accordance with the present invention, when taken in connection with the accompanying drawings, wherein.

DESCRIPTION OF THE PREFERRED EMBODIMENT

Figure 1:
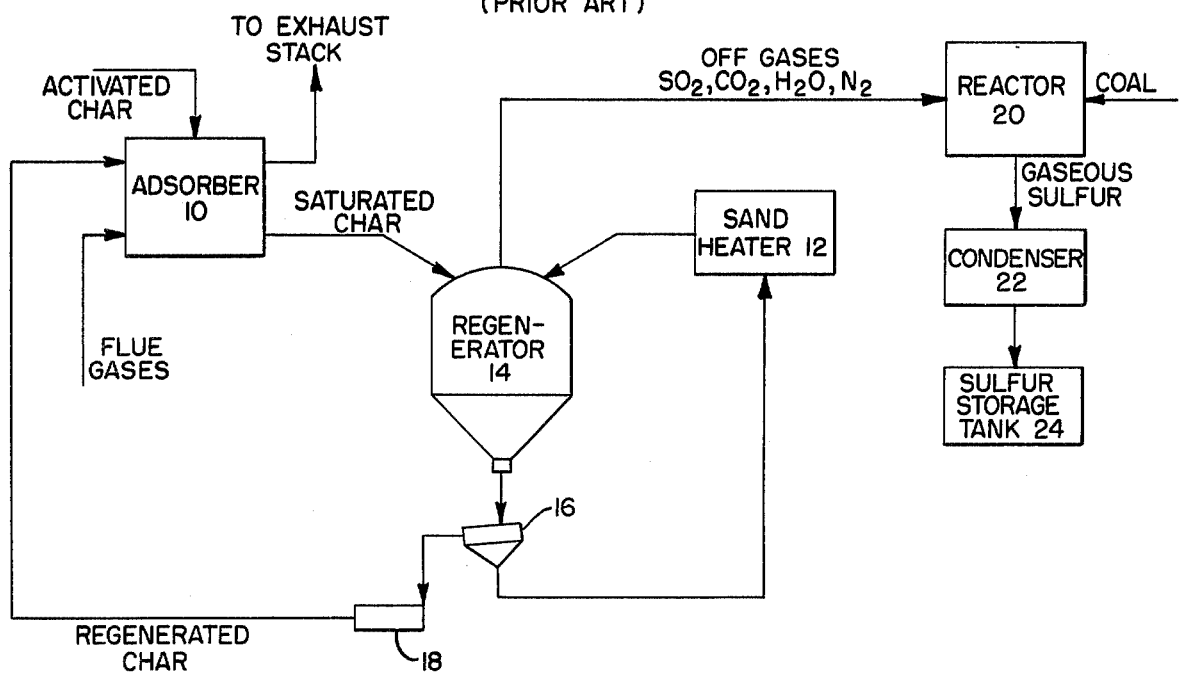
FIG. 1 is a schematic diagram showing the flow of materials in a pollution control system of the prior art for the removal of sulfur oxides in flue gases.

Referring more particularly to FIG. 1 of the drawings, which depicts the flow of materials between the primary subsystems in a pollution control system of the prior art used for the removal of sulfur oxides from flue gases, such as those discharged by a vapor generator. The system is composed of three basic subsystems: adsorption, regeneration or desorption, and off-gas treatment. In the adsorption subsystem, an adsorber 10 receives flue gases from the vapor generator after they have passed through a particulate matter separator, or the like (not shown), and the flue gases are contacted with adsorbent material in pellet form loaded into the adsorber. The adsorbent material used in the adsorber 10 is usually in the form of a preoxidized bituminous coal, or activated char, which is characterized by excellent adsorption characteristics, high ignition temperature, and good physical strength.

The sulfur dioxide ($SO_2$) contained in a diluted form in the flue gases is adsorbed into the porous system of the activated char in a two-stage reaction. First, the $SO_2$, oxygen and water in vapor form are adsorbed on the $SO_2$ is converted into sulfuric acid, which is retained, in the porous system of the activated char pellets. The activated char pellets also adsorb other gases, such as nitrogen oxides, in a similar manner, and filter particulate material entrained in the gases. The acid-laden or saturated char pellets leave the adsorber 10, and are carried by a conventional conveying system (not shown) to the regeneration, or desorption, subsystem.
shown) to the regeneration, or desorption, subsystem.

In the regeneration subsystem, an inert, heat exchange medium, such as sand, is heated in a sand heater 12 to a predetermined, elevated temperature, and is supplied to a regenerator 14, through which the heated sand and the saturated char pellets pass in intimate contact. This contact raises the temperature of the mixture to a predetermined level to cause the sulfuric acid in the porous system of the activated char to be converted first to sulfuric acid anhydrate ($H_2SO_3$) and then to $SO_2$, and the nitrogen compounds to $N_2$. A highly-concentrated, $SO_2$-rich off-gas stream is produced, containing 20-30% by volume, and is usually directed to an exterior unit for further processing. The sand/char mixture leaving the regenerator 14 goes through a separator 16, which separates the regenerated char from the sand. The separated sand is returned to the sand heater 12, again heated to the proper elevated temperature, and recycled into the regenerator 14. The separated char is directed to a char cooler 18, in which it is cooled and recycled to the adsorber 10 for re-use.

In this type of prior art system, the $SO_2$-rich off-gas is usually treated further to produce elemental sulfur, which is storable and which has certain commercial applications. To this end the off-gas can be reacted with crushed coal to produce the elemental sulfur. For example, in the system disclosed in the above-identified application, the $SO_2$-rich off-gas is introduced into a reactor, shown in general by the reference numeral 20 in FIG. 1, and is initially reacted with crushed coal which is continuously supplied to the vessel to yield gaseous elemental sulfur, which is then passed to a condenser 22 and condensed into liquid sulfur. The liquid sulfur may be stored in appropriate containers, or may be cooled into solid form.

In the above-described system of FIG. 1, a certain quantity of the activated char is consumed by the chemical reaction which occurs in the regenerator 14, and as a result of the continuous recycling of the regenerated char, a portion of this material becomes physically reduced to such a size which renders it ineffective in the adsorption process. Thus, a source of additional activated char is provided to the adsorber 10 to replenish the char consumed in the regenerator 14 and to make up for the quantity which is physically reduced. (In the reactor 20, the crushed coal supplied thereto is consumed in the reaction process, yielding coal ash as a by-product, which is not otherwise utilized in the process.)

Figure 2:
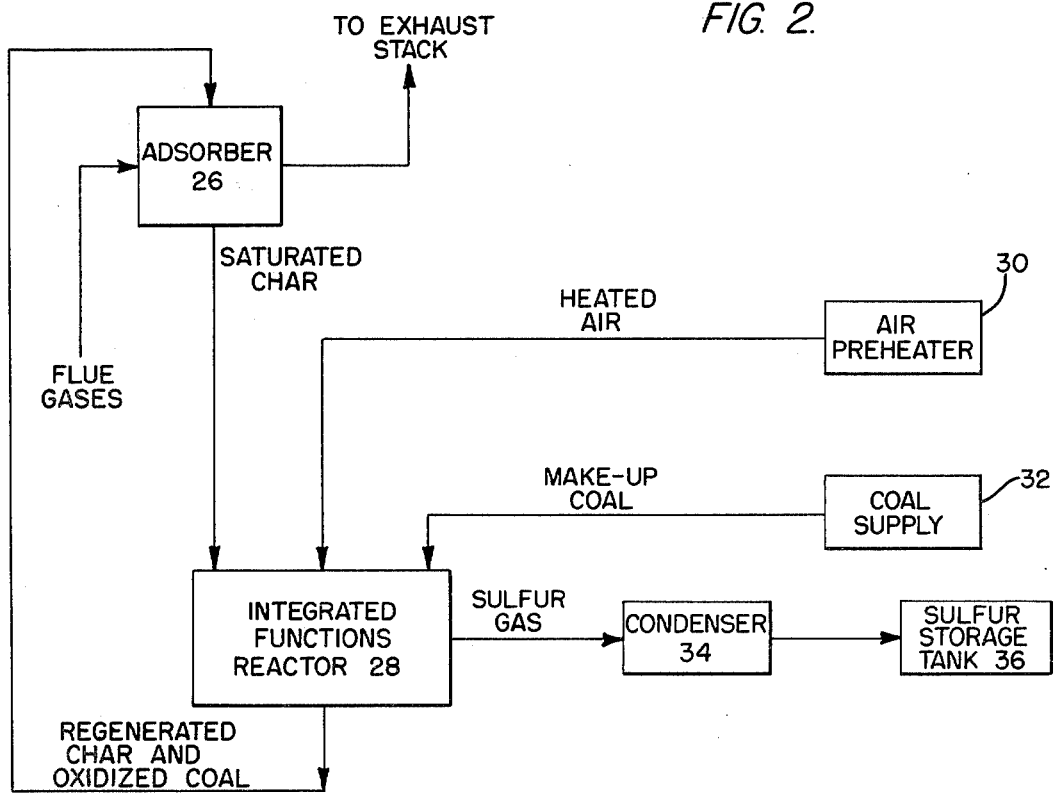
FIG. 2 is a schematic diagram shownning the flow of materials in a pollution control system of the present invention for the removal of sulfur oxides from flue gases.

Shown in FIG. 2 are the primary subsystems and the flow of materials which comprise the pollution control system of the present invention for the removal of sulfur oxides from flue gases. An adsorber 26 is provided to receive the flue gases from a source, such as vapor generator (not shown), and is provided with an initial charge of activated char. The treated flue gases are discharged to the exhaust stack (not shown), and the saturated char is conveyed to an integrated functions reactor 28, in which the dual function of regeneration of the saturated char and reduction of the sulfur oxides is performed. Heated air from a suitable source 30, such as an air preheater utilizing a fluidized bed or a heat exchanger recapturing the heat of the exhaust flue gases, both of which are known in the art, is also introduced into the reactor 28, along with make-up coal from a supply 32 of crushed coal. The regenerated char and the oxidized coal are passed to a cooler (not shown) and recycled to the adsorber 26.

The gaseous stream of elemental sulfur and carbon dioxide produced by the reactor 28 is passed by conventional means from the reactor to a condenser 34, in which the sulfur gas is liquified. The liquid sulfur is then placed in storage tanks 36, or processed and stored in solid form, and the carbon dioxide gas is discharged into the atmosphere.

In the operation of the pollution control system shown in FIG. 2, the flue gases are introduced into the adsorber 26, into which a predetermined charge of activated char has been introduced. Within the adsorber 26, the activated char moves continuously and downwardly in mass flow, and the sulfur dioxide in the flue gases passing through the activated char is adsorbed and oxidized to sulfuric acid by the oxygen and water vapor present in the flue gases. After it has passed through the activated char, the flue gases are passed to the exhaust stack for discharge into the air, and the saturated activated char is discharged from the adsorber 26. Particulates mixed with the saturated char are separated within a separator, such as a vibrating sieve, or the like (not shown), and the separated, saturated char is introduced into the integrated functions reactor 28, along with crushed, make-up coal from the coal supply 32 and air from the preheater 30.

Portions of the make-up coal and the saturated char are burned in the presence of the heated air to provide reaction-sustaining heat within the reactor 28. In the presence of the heat, the saturated char is regenerated in the manner discussed above, which is substantially a modified reversal of the adsorption reaction that occurred in the adsorber 26, resulting in a reduction of the sulfuric acid contained in the porous system of the activated char to $SO_2$. Further, in the presence of carbon provided by the saturated char and the crushed make-up coal, the sulfur oxides are reduced to carbon dioxide and gaseous elemental sulfur.

The make-up coal which is not burned is oxidized by the $SO_2$ gas during the reduction process, which then has a system of pores which are of a size and nature which renders them sufficiently effective as an activated carbonaceous material for use in the adsorption process, along with the remaining quantity of activated char. The regenerated activated char and the oxidized make-up coal are cooled and conveyed to the adsorber 26 for use in the adsorption of the flue gases in the manner described above.

The gaseous mixture of $CO_2$ and sulfur is introduced into the condenser 34, which operates in a conventional manner to reduce the sulfur to a liquid form, which is subsequently conveyed to the storage tanks 36, or is processed into solid form for storage prior to disposal or sale. The gaseous $CO_2$ is not condensed, and is passed to the atmosphere from the condenser 34. The ashes produced as a result of the consumption of carbon are removed in a conventional manner.

Saturated activated char comprises the greater portion of the adsorbent material introduced into the integrated functions reactor 28 during the initial cycles through the reactor. As indicated above, a portion of the char is chemically or otherwise consumed and another portion is physically reduced to a size which is ineffective in the adsorption process. The reduction in the quantity of char in each cycle through the pollution control system is between 1-5%, and accordingly the quantity of make-up coal provided to the reactor 28 is regulated so that it replaces the crushed coal burned to provide the heat for the reduction of sulfur oxides and in addition provides a quantity of oxidized crushed coal to replace the activated char consumed. It should be noted that with each successive cycle, the adsorption characteristic of the oxidized coal is increased due to the repeated oxidization and reduction cycles, and the increase in the porosity system of the oxidized coal. Thus, at some point the adsorption characteristics of the oxidized coal and the activated char are substantially identical.

A pollution control system and method for the removal of sulfur oxides from flue gases has thus been disclosed having an adsorber in which the sulfur oxides are removed from the gases, and an integrated functions reactor in which the saturated carbonaceous adsorbent material is regenerated, and in which the sulfur oxides are reduced to elemental sulfur. The crushed coal and the saturated char supplied to the integrated reactor provides the necessary chemical reducing agent (carbon), and the products of the integrated reactor furnish the supply of activated char for the adsorber. Coal is the only material consumed in the system, and a separate source of activated char, other than the first charge to initiate operation of the system, is unnecessary for the effective, continued operation of the system, thus substantially reducing the amount of expensive raw material required by the system. Energy requirements are also reduced since the production of activated char as a separate industrial process requies a relatively large energy input as compared to the system described herein. Furthermore, the requirements for a separate thermal regenerator and an inert heat exchange medium are eliminated, thereby reducing the capital investment, and the substitution of the oxidized coal resulting from the operation of the integrated reactor for the consumed activated char results in a substantial operating cost reduction.

While heated combustion-supporting air is introduced into the integrated functions reactor, unheated air can be used. However, the use of heated air substantially reduces the quantity of crushed coal consumed, and in an operative environment such as a vapor generator a source of reclaimable exhaust heat is readily available to preheat the combustion-supporting air.

Although not particularly illustrated in the drawings, it is understood that all of the components described above are arranged and supported in an appropriate fashion to form a complete and operative system. Further, it is understood that all anciliary components, such as motors, pumps, blowers, fuel sources, material transfer systems, etc., have not been specifically described, but such components are known in the art and would be appropriately incorporated into the operative system.

Of course, variations of the specific construction and arrangement of the pollution control system disclosed above can be made by those skilled in the art without departing from the invention as defined in the appended claims.

What is claimed is:

1. A method for treating a sulfur oxides-saturated carbonaceous adsorbent char comprising the steps of:
   passing said char to a vessel;
   introducing combustion-supporting air into said vessel;
   introducing a quantity of coal into said vessel; and
   simultaneously burning a portion of said quantity of coal as a fuel to provide heat to desorb said char of said sulfur oxides and reacting said sulfur oxides with the remaining portion of said coal to produce gaseous elemental sulfur, the adsorbent characteristics of said remaining coal portion being enhanced such that said remaining coal portion constitutes a carbonaceous adsorbent material after said reacting.

2. The method of claim 1, further comprising the steps of:
   condensing said gaseous elemental sulfur to liquid sulfur; and
   conveying said desorbed char and said reacted portion of coal to an adsorption means for use as adsorbent material.

3. The method of claim 1, wherein the step of introducing combustion-supporting air includes heating said air to a predetermined temperature.

4. The method claimed in claim 1 wherein:
   said remaining coal portion undergoes an increase in porosity as a consequence of said reacting.

5. The method claimed in claim 1 wherein:
   said char and said remaining coal portion pass through said vessel in continuous mass flow.

6. The method claimed in claim 1, further comprising the step of:
   conveying said desorbed char and said reacted portion of coal to an adsorption means for use as adsorbent material.

7. A method for the removal of sulfur oxides from flue gases and the production of elemental sulfur comprising:
   contacting the flue gases with an adsorbent char in a first vessel and adsorbing the sulfur oxides onto said char;
   passing the sulfur oxides saturated char to a second vessel;
   introducing a quantity of coal into said second vessel;
   simultaneously burning a portion of said quantity of coal as a fuel in the presence of said sulfur oxides-saturated char to provide heat to desorb said char of said sulfur oxides and reacting said sulfur oxides with the remaining portion of coal to produce gaseous elemental sulfur, the adsorbent characteristics of said remaining coal portion being enhanced such that the remaining coal portion constitutes a carbonaceous adsorbent material after said reacting;
   condensing said gaseous elemental sulfur to liquid sulfur; and
   conveying said desorbed char and said reacted portion of said coal to said first vessel for use as an adsorbent material.

8. The method of claim 7, wherein the step of introducing combustion-supporting air includes heating said air to a predetermined temperature.

9. The method claimed in claim 7 wherein:
   said remaining coal portion undergoes an increase in porosity as a consequence of said reacting.

10. The method claimed in claim 7 wherein said char and said remaining coal portion pass through said second vessel in continuous mass flow.

11. The method claimed in claim 7 wherein said char and said reacted portion of said coal are cyclicly conveyed in continuous mass flow through said first vessel and said second vessel.

12. The method claimed in claim 10 wherein:
said char portion of said flow of char and said reacted portion of said coal is diminished with each successive cycle.

13. The method claimed in claim 11 wherein:
said char portion is diminished by between one and five percent on each successive cycle.

* * * * *